United States Patent

Stedman

[15] 3,659,112

[45] Apr. 25, 1972

[54] MASTER LINK FOR CUSHIONED TRACK

[72] Inventor: Robert N. Stedman, Chillicothe, Ill.

[73] Assignee: Caterpillar Tractor Co., Peoria, Ill.

[22] Filed: June 30, 1970

[21] Appl. No.: 51,116

[52] U.S. Cl. .................................................305/58, 74/258
[51] Int. Cl. ..........................................................B62d 55/20
[58] Field of Search .................................305/58, 39; 74/258

[56] References Cited

UNITED STATES PATENTS

| 3,020,096 | 2/1962 | Strnad | 305/58 |
|---|---|---|---|
| 63,996 | 4/1867 | Greuzbaur | 74/258 X |
| 3,427,079 | 2/1969 | Skromme | 305/58 |
| 2,318,683 | 5/1943 | Galanot | 305/58 |
| 2,882,102 | 4/1959 | Rund | 305/58 X |

Primary Examiner—Richard J. Johnson
Attorney—Fryer, Tjensvold, Feix, Phillips & Lempio

[57] ABSTRACT

A two-piece master link for a vehicle track has overlapping parts detachably connected together by bolts. The mating surfaces of the overlapping parts are serrated to connect the parts together and to relieve shear stresses on the bolts. The serrations are arcuate so that the parts may be joined by rotation thereof, avoiding a need for providing for lateral separation of the serrated surfaces.

13 Claims, 2 Drawing Figures

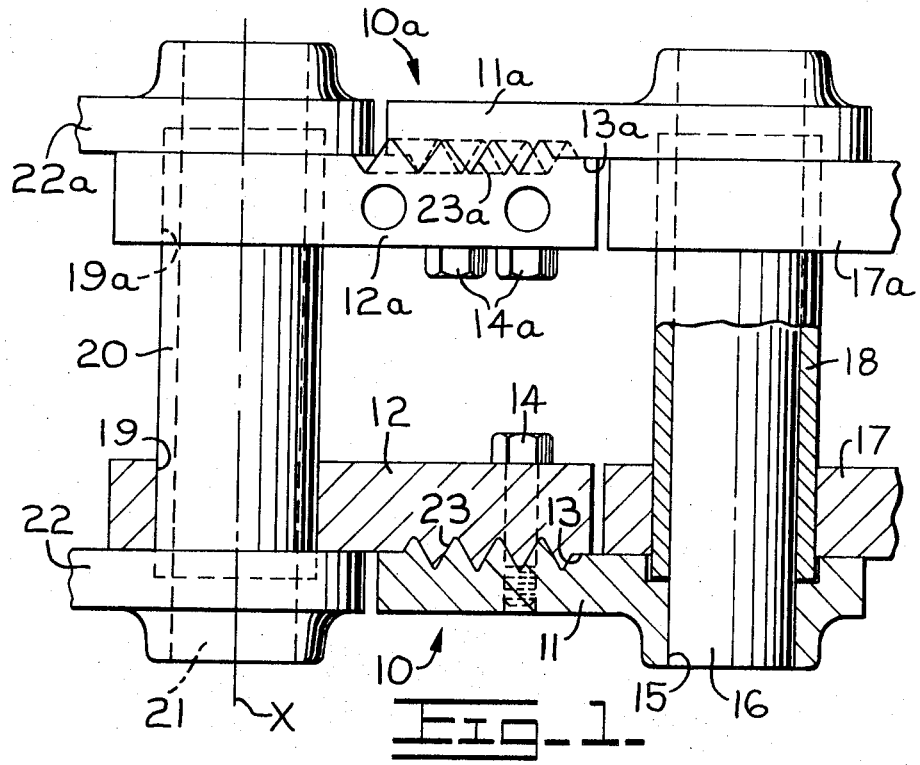
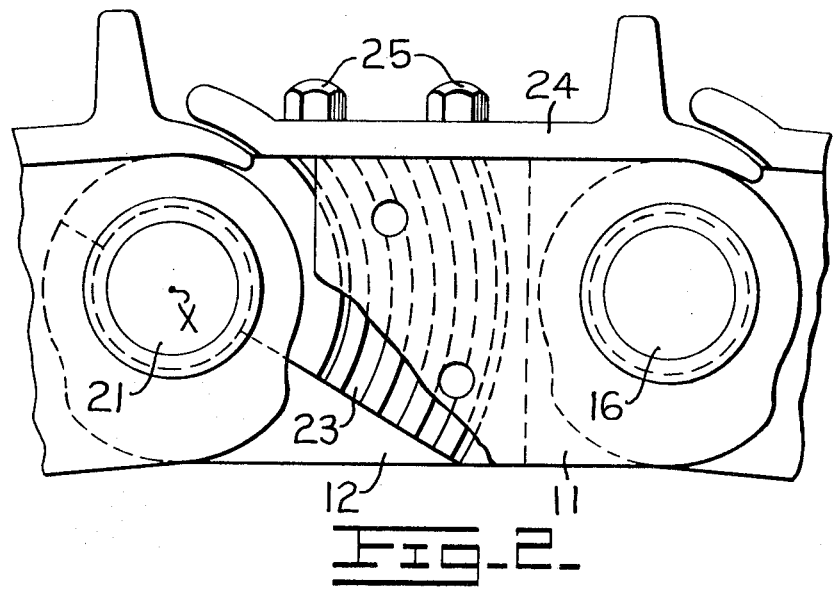

MASTER LINK FOR CUSHIONED TRACK

BACKGROUND OF THE INVENTION

This invention relates to a master link which may be used in track assemblies such as the type described in U.S. application Ser. No. 884,903 filed Dec. 15, 1969 now U.S. Pat. No. 3,601,212. Such application is assigned to the assignee of this application.

Such endless track assemblies typically comprise two link assemblies comprising a plurality of pins and bushings connected together by a plurality of pairs of links. The links have bores formed in the ends thereof which are tightly received, respectively, on bushings and pins inboard and outboard of the adjacent links. Track shoes are attached to each pair of links to provide a ground-engaging track.

One conventional method for forming an endless track is to provide a pair of master links for joining the ends of the track together by means of a suitably sized master pin. Such method gives rise to sealing and related problems in the vicinity of the master pin. In addition, the ends of the track must be precisely drawn together to precisely align the bores for the master pin, thus giving rise to installation and replacement problems.

Another conventional method is to form each master link into two parts having their ends overlapped and bolted together. Such bolts are normally subjected to a large portion of the shearing forces occurring in the track and consequently frequently fail. To relieve such forces on the bolt, the overlapped ends of the master links are sometimes designed with interlocking hooks, notches, or serrations which tend to counteract the forces.

One drawback inherent with the latter master link is that the link parts must be moved in a direction normal to their mating surfaces once the loose ends are precisely drawn together for installation and replacement purposes. Such installation can prove quite difficult, particularly when the track requires radial compression on the type of annular, resilient spacer means disclosed in the above-referenced application. In addition, during operation of the track, lateral displacement of the attached parts of the master link is prevented only by the bolts connecting the overlapping link parts together to thus place substantial axial forces on such bolts.

SUMMARY OF THE INVENTION

It is an object of the present invention to provide a master link for a vehicle track, with mating surfaces having interlocking notches or serrations, but which do not require any respective lateral displacement of the link parts in joining such parts.

It is another object of this invention to provide a master link having interlocking mating surfaces which will provide maximum shear strength and maximum resistance to lateral separation at the juncture thereof.

It is still another object of this invention to provide a master link for a vehicle track having interlocking mating surfaces that can be readily and expeditiously joined together notwithstanding resistance encountered during radial compression of the track on a resilient spacer means.

BRIEF DESCRIPTION OF THE DRAWINGS

FIG. 1 is a partially sectioned, top plan view of a pair of master links embodying the present invention; and FIG. 2 is a side elevation of one of the master track links of FIG. 1 shown attached to ground engaging track shoes with one part of the link partially broken away.

DETAILED DESCRIPTION OF THE INVENTION

In FIG. 1 a pair of master links is shown generally at 10 and 10a as comprising overlapping parts or portions 11, 11a and 12, 12a which engage each other respectively at interlocking mating surfaces 13 and 13a, and are held in engagement by cap screws 14 and 14a. Part 11 forms a pin bore 15 which is tightly received on pin 16, carried in bushing 18, which in turn is carried on one end of the track by links 17 and 17a. Part 12 forms a bushing bore 19 which is tightly received on bushing 20 carried on pin 21, which in turn is carried on the other end of the track by links 22 and 22a to form a pivot means.

As seen in FIG. 2, the mating surfaces 13 each include arcuate serrations 23, comprising interengaging locking means, which are concentric about the longitudinal axis X of the pivot means. A grousered track shoe 24 is attached to the top of link parts 12 and 12a as by cap screws 25. Although the interengaging locking means is herein described as being used in conjunction with a double-link master link, it should be understood that same could be used in a single-link master link for the type of link assembly shown in FIG. 21 of the above-referenced patent application, for example.

The pin bores and bushing bores of the track links, including the master link parts, are pressed on the respective pins and bushings of the track, and normally cannot be removed by hand. Accordingly, it can be seen from FIG. 2 that the respective link parts of the master links cannot be joined or separated by lateral displacement of one end of the track with respect to the other, or of one link part with respect to the other. However, from FIG. 1 it can be seen that part 12 can be joined and detached from part 11 by rotating part 12 about axis X. Therefore, to join the two parts of the master link and thus the two ends of the track to which they are respectively attached, it is necessary merely to bring the ends of the track together, with part 12 rotated upwardly to avoid interference with part 11, until the first matching serrations on parts 11 and 12 are engaged. Thereupon, part 12 may be hammered or otherwise moved into full engagement with part 11 by rotating it downwardly until it is aligned with part 11. The two parts of the master link may be then fastened in place by cap screws 14 or other suitable securing means, and a track shoe is attached to the top of the links by cap screws to complete the track. To separate the track ends, the foregoing operation is reversed.

What is claimed is:

1. A master link assembly in a longitudinal track chain comprising a first link portion mounted on a first pivot means for rotational movement about an axis thereof, a second link portion including a second pivot means remote from said first pivot means at least partially overlapping and abutting said first link portion and arcuately shaped interengaging locking means formed on overlapping surface portions of said first and second link portions for connecting them together, said locking means at least substantially disposed at a constant radius from the axis of one of said pivot means.

2. The master link defined in claim 1 wherein the locking means comprises a plurality of arcuate and concentric serrations.

3. The invention of claim 1 wherein said master link assembly comprises a laterally spaced pair of first link portions and a laterally spaced pair of second link portions, and said pivot means comprises an elongated pivot pin connecting said pair of first link portions together.

4. The invention of claim 3 wherein said pair of first link portions are positioned between said pair of second link portions, one of said locking means connecting each one of said first link portions to a respective one of said second link portions.

5. A master track link comprising two separable parts, one end of each part defining respectively a pin bore, and a bushing bore longitudinally spaced from the pin bore, and the other ends of said parts defining mating surfaces intermediate the pin bore and the bushing bore and perpendicular to said bores, one of said mating surfaces being provided with at least one projection which extends into corresponding depressions formed in said other mating surface, said depressions being formed so as to accommodate said projections as one part is rotated with respect to the other in a plane parallel to said mating surfaces.

6. The master link defined in claim 5 wherein said projection is an arcuate notch and said depression is an arcuate groove.

7. The master link defined in claim 5 wherein the mating surfaces are provided with matching multiple arcuate serrations.

8. The invention of claim 5 wherein the serrations are concentric about an axis of rotation of one of the parts.

9. In a vehicle track comprising a plurality of pins, which include bushings along the central portion thereof, interconnected by a plurality of pairs of links wherein each link of each pair of links overlaps an adjacent link of an adjacent pair of links so that outer overlapping first end portions of a pair of links receive the ends of a pin in bores found therein and are positioned without inner, overlapped second end portions of the adjacent pair of links which receive the bushing on said pair in bores formed therein, a master coupling comprising a pair of links comprising a pair of pin bore end parts and a pair of bushing bore end parts, one of said pairs of parts overlapping the other of said pairs of parts laterally outboard thereof and engaging said other pair of parts at abutting, mating surfaces extending perpendicular to said pins, said mating surfaces being provided with arcuate serrations whereby the pairs of parts are engageable by rotation of one pair of parts about their bore ends relative to the other pair of parts.

10. The master coupling of claim 9 wherein the pair of pin bore end parts engage the pair of bushing bore end parts outboard of the bushing bore end parts.

11. The master coupling of claim 9 wherein the pair of pin bore end parts engages the pin of bushing bore end parts inboard of the bushing bore end parts.

12. The master coupling of claim 9 wherein the abutting, mating surfaces are held in engagement by fastening means extending laterally through the overlapping surfaces.

13. A master link assembly comprising first and second laterally spaced master links each comprising overlapped first and second link portions, interengaging arcuately extending locking means formed on overlapped surface portions of the first and second link portions of each of said master links, said first link portions positioned between said second link portions, and means for attaching all of said link portions together.

* * * * *